Patented Apr. 17, 1923.

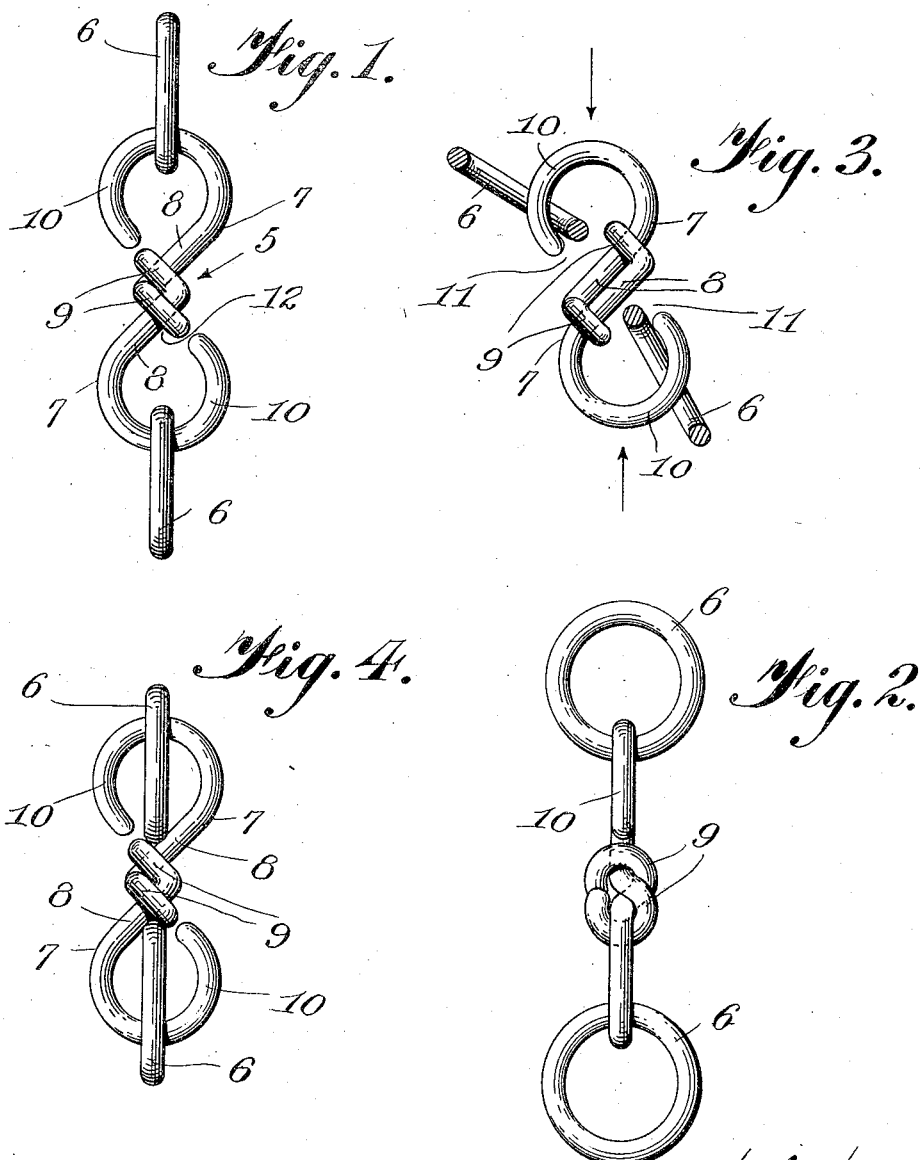

1,452,476

UNITED STATES PATENT OFFICE.

CLARK E. CARTER, OF MONTREAL, QUEBEC, CANADA.

CHAIN LINK.

Application filed March 15, 1922. Serial No. 543,930.

*To all whom it may concern:*

Be it known that I, CLARK E. CARTER, a subject of the King of Great Britain, residing at Montreal, Province of Quebec, Canada, have invented certain new and useful Improvements in Chain Links; and I do hereby declare that the following is a full, clear, and exact description of the invention, such as will enable others skilled in the art to which it appertains to make and use the same.

The present invention relates to improvements in chain links.

The primary object of the invention is the provision of a detachable chain link designed for replacement purposes in substitution for broken links in tire chains or the like, wherein a quick replacement under unfavorable circumstances is necessary and desirable.

Another object of the invention is the provision of a chain link, so constructed that when engaged with the permanent links of a chain and when in operative position, it will be held against any undesired displacement.

A further object of the invention is the provision of a chain link such as above referred to, which includes a pair of movable sections which when in one position render it easily applicable to the permanent links of a chain for connecting the latter and when in another position will be held against any undesired displacement or disconnection from the said permanent links.

A still further object of the invention is the provision of a chain link including a pair of substantially parallel shank portions having interengaging eyes at the inner ends and oppositely disposed hooks at their outer ends for engagement with and attachment to the permanent links of a chain for the replacement of a broken link therein.

A further object of the invention is the provision of a link such as above referred to which may not only be used for replacement purposes but which may also form if desired, the permanent links of a chain.

A still further object of the invention is the provision of a chain link which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawing forming a part of the present application, and in which:

Figure 1 is a side view of a link constructed in accordance with the present invention; and shown in engagement with the permanent links of a chain;

Figure 2 is an edge view thereof;

Figure 3 is a side view of the link showing the same in such position as to render it easily detachable from the permanent links of a chain; and Figure 4 is a view similar to Figure 1 showing the sections of the link in their extended position with the permanent links held therein against displacement.

Referring now to the accompanying drawing by corresponding characters of reference throughout the several views, the numeral 5 designates in general my improved chain link which is shown applied to the usual permanent links 6 of a chain of any desired form, the particular type of chain not forming any part of the present invention.

My improved link 5 comprises reversed counterpart sections 7, each of which has a straight shank portion 8 with eyes 9 formed upon their overlapped ends and surrounding the adjacent shank portion of the co-acting section, thus rendering the said shanks slidable relative to each other from the position shown in Figure 1 to that shown in Figure 2.

Oppositely disposed hooks 10 are formed upon the outer ends of the shanks 8 and are curved to points adjacent the said shanks and spaced slightly therefrom to form passages 11 through which the permanent links 6 may be passed within the hooks.

When the link is in extended position, it will be noted that the eyes 9 are in alignment with and form continuations of the ends of the hooks 10, thus closing the passages 11 and preventing the displacement or undesired removal of the permanent links 6 therefrom.

When in the extended position shown in Figure 1, it will be noted that the points of intersection of the shanks and eyes are in alignment with the central portions of the hooks, forming stops indicated by the numeral 12 for engagement with the links 6 when they are forced inwardly as shown in Figure 4. This arrangement serves to force the eyes at all times in alignment with the ends of the hooks 10 and by holding them in such position, renders it impossible for the said link 5 to become disconnected from the permanent links 6.

From the foregoing description taken in connection with the accompanying drawings, it will be manifest that a renewable link which is especially designed for anti-skid chains for automobile tires is provided, which will fulfil all of the necessary requirements of such a device, and it should be understood in this connection that I am not to be limited to such use of the link alone, but may employ the same for any other purposes to which the various parts thereof will adapt themselves, and it should be further understood that various minor changes in the specific details of construction can be resorted to within the scope of the appended claims, without departing from the spirit or sacrificing any of the advantages of the invention.

Having thus fully described my invention, what I claim as new and desire to protect by Letters Patent is:—

1. A link of the type described comprising a pair of relatively slidable shanks, an eye formed upon one end of each shank and embracing the opposite shank whereby said eyes are adapted to contact with each other to limit in one direction the slidability of the shanks, and hooks formed upon the remaining ends of the shanks.

2. A link of the type described comprising a pair of relatively slidable shanks, an eye formed upon one end of each shank and embracing the opposite shank, hooks formed upon the remaining ends of the shanks, each eye being adapted to close the space between the shank embraced thereby and the open end of the hook formed on the last named shank.

3. As a new article of manufacture, a replacement link for chains and the like, comprising a pair of sliding sections each section including a shank member an eye provided upon one end of each shank member embracing the adjacent shank member, whereby said sections are slidably connected, a reversed link formed upon the opposite end of each shank and curved inwardly towards the sides of the adjacent shank terminating in spaced relation thereto and providing passages forming an entrance to the hooks for attachment purposes, the points of intersection of the eyes and shanks when the sections are in one position being in alignment with the central points of the hooks, and when in such position said eyes forming a continuation of the hooks and closing the passages, substantially as for the purposes set forth.

In witness whereof I have hereunto set my hand.

CLARK E. CARTER.